Oct. 25, 1955 L. BERTELE 2,721,499
FIVE COMPONENT WIDE-ANGLE OBJECTIVE
Filed July 5, 1952
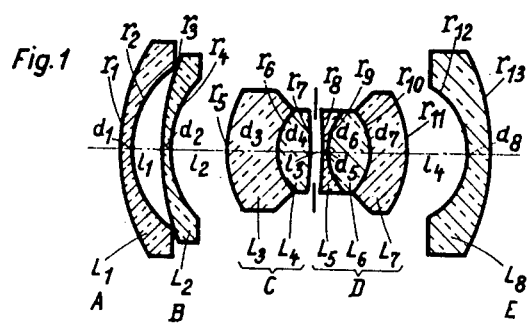
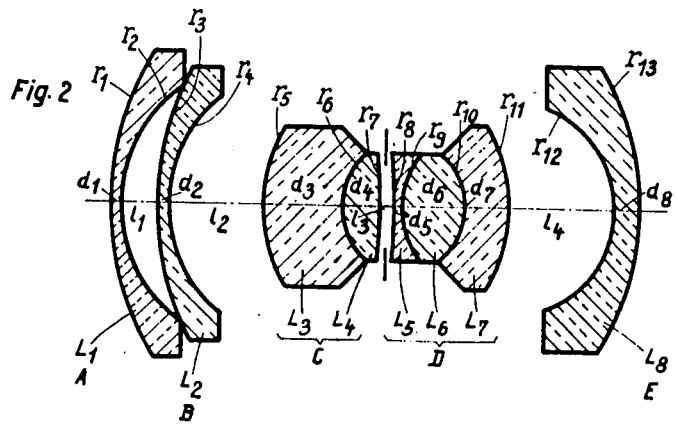
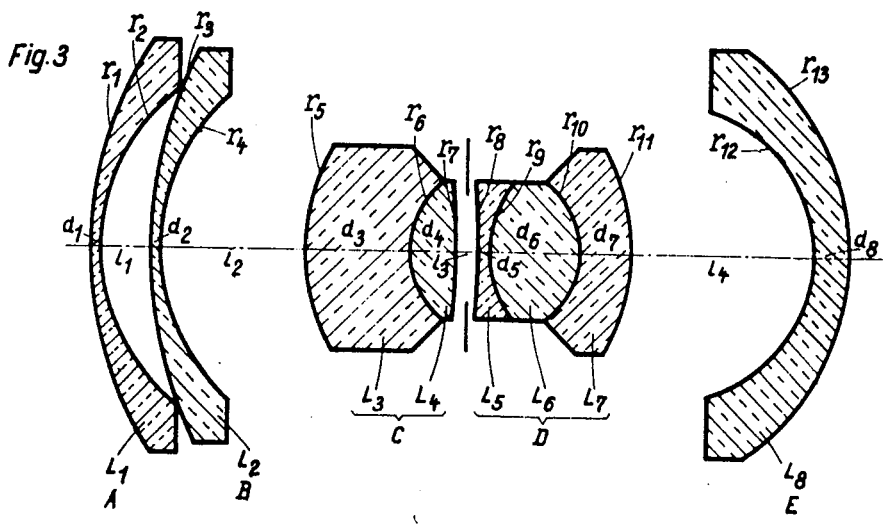
Ludwig Bertele United States Patent Office 2,721,499
Patented Oct. 25, 1955

2,721,499
FIVE COMPONENT WIDE-ANGLE OBJECTIVE

Ludwig Bertele, Heerbrugg, Switzerland

Application July 5, 1952, Serial No. 297,322

Claims priority, application Switzerland July 12, 1951

8 Claims. (Cl. 88—57)

The object of the invention is a wide-angle objective consisting of five lens components separated by air spaces. Beginning at the side directed towards the object to be photographed the first component (A) and the second component (B) are each a dispersing meniscus element the respective outer surfaces being bent towards the object to be photographed, the third component (C) and the fourth element (D) are each converging and composed of several lenses, and the fifth component (E) is a dispersing meniscus element with its outer convex surface bent towards the image, the air space between the first and the second components having the shape of a collecting meniscus element with its convex outer surfaces turned towards the object to be photographed, and the second and the fourth air spaces having the shape of a meniscus element with the respective outer surfaces being bent towards the object to be photographed and to the image respectively, in the third air space the iris diaphragm is to be located.

With such a lens sequence it is possible to cover an image field of more than 90° with good sharpness. In order to fully utilize the inherent favorable characteristic of this type regarding the light decrease occurring towards the image periphery, it is necessary above all to provide for the oblique pencils a passage through the objective without vignetting. This presupposes, besides sufficiently large free lens diameters, that the oblique pencils are not unduly afflicted with a comatic aberration disturbing image formation. Investigations have shown that this can be avoided above all by placing on the side facing the object to be photographed both said lens components (A and B) which are separated by an air space in the shape of a collecting meniscus element with its convex outer surface turned towards the object to be photographed. On the image side use of a single dispersing lens element suffices.

In order to keep the zonal bulging of the spherical aberration curve sufficiently small, it is suitable to make the outer surfaces each of the third and fourth component turned towards the object to be photographed and to the image respectively convex. It is furthermore suitable to this end always in accordance with the desired relative aperture, in both these components to keep the separation of the two outer surfaces turned towards the object to be photographed and to the image respectively greater than 0.40 of the focal length of the objective and smaller than 1.6 of this focal length.

In the two positive components (C and D) there is suitably located, one each, a cemented surface being convex towards the object to be photographed and to the image respectively, whereat the sum of the radii of curvature of both these cemented surfaces is greater than 0.30 f and in each of them the glass adjacent to the convex side has a higher index of refraction than that adjacent to the concave side. Suitably at least also the fourth component (D) contains a cemented surface convex towards the object to be photographed and in which the glass adjacent to the concave side having a higher refractive index than that adjacent to the convex side.

In consideration of the astigmatic correction, the air space between the third and the fourth components is suitably selected greater than 0.03 f.

In order to obtain utmost equality of image sizes for the different colors of the spectrum at every usable image angle, it further is suitable to select the sum of the Abbe number V for the first two components greater than 100.0.

Cementing of the lens surfaces can be entirely or partially dispensed with since the reflection with those glass surfaces bordering on air can be eliminated to a great extent. In this case thinner air layers can arise within the individual components at facing surfaces with small differences in curvature. Components subdivided in this manner are to be considered as a single component in the sense of the invention. Also air layers introduced for any reason whatsoever, with plane or curved boundary surfaces, fall under this point of view.

In the accompanying drawing three examples according to the invention are illustrated having an image angle of about 90° and a focal length of 100 mm., which differ chiefly in their relative aperture.

Figs. 1, 2 and 3 each represent sectional views showing the form and arrangement of the objective lenses according to the present invention depicting the notations employed in the numerical Examples 1, 2 and 3.

The example according to Fig. 1 has a relative aperture of 1:6.3. The separation of the two convex outer surfaces of the third and the fourth components is 0.639 f. The radius of curvature of the cemented surface is 0.183 f in the third component C, and the radius of curvature of the cemented surface convex to the image in the fourth component D is 0.205 f; the sum of these two radii of curvature is 0.388 f, therefore greater than 0.30 f. Th sum of the V-values of the first two components A and B is 137.0. The air space between the third and the fourth components is 0.033 f.

The example according to Fig. 2 has a relative aperture of 1:4.5. The separation of the two convex outer surfaces of the third and the fourth components is 0.92 f. The radius of curvature of the cemented surface is 0.254 f in the third component C, and the radius of curvature of the cemented surface convex towards the image in the fourth component D is 0.255 f. The sum of these two radii of curvature is 0.509 f. The sum of the V-values of the first two components A and B is 137.0. The air space between the third and the fourth components is 0.047 f.

The example according to Fig. 3 has a relative aperture of 1:3.4. The separation of the two convex outer surfaces of the third and the fourth components is 1.225 f. The radius of curvature of the cemented surface is 0.336 f in the third component C, and the radius of curvature of the cemented surface convex towards the image in the fourth component D 0.315 f. The sum of these two radii of curvature is 0.651 f. The sum of the V-values of the first two components A and B is 137.0. The air space between the third and the fourth components is 0.064 f.

The optical data of the represented objectives are given in the following list, in which L designates the individual lens elements
r the radii
d the lens thicknesses
l the air spaces
n the refractive indices, and
V the Abbe numbers.

Example 1

[Focal length f=100 mm.   Relative aperture 1:6.3]

| | Radii | Thickness and Separations | Glass kinds $n_D$ | V |
|---|---|---|---|---|
| $L_1$ | $r_1 = + 73.93$ | $d_1 = 3.60$ | 1.50380 | 66.7 |
| | $r_2 = + 35.30$ | $l_1 = 10.70$ | | |
| $L_2$ | $r_3 = + 88.35$ | $d_2 = 3.05$ | 1.48697 | 70.3 |
| | $r_4 = + 35.30$ | $l_2 = 20.30$ | | |
| | $r_5 = + 39.35$ | | | |
| $L_3$ | | $d_3 = 18.30$ | 1.72050 | 50.3 |
| $L_4$ | $r_6 = + 18.28$ | $d_4 = 11.30$ | 1.60739 | 53.3 |
| | $r_7 = - 135.26$ | $l_3 = 3.30$ | | |
| | $r_8 = - 166.0$ | | | |
| $L_5$ | | $d_5 = 1.93$ | 1.54579 | 59.6 |
| $L_6$ | $r_9 = + 21.23$ | $d_6 = 15.20$ | 1.60000 | 60.7 |
| | $r_{10} = - 20.46$ | $d_7 = 13.90$ | 1.71966 | 29.3 |
| $L_7$ | $r_{11} = - 38.82$ | $l_4 = 23.10$ | | |
| | $r_{12} = - 26.68$ | | | |
| $L_8$ | | $d_8 = 9.40$ | 1.64200 | 58.1 |
| | $r_{13} = - 79.85$ | | | |

Example 2

[Focal length f=100 mm.   Relative aperture 1:4.5]

| | Radii | Thickness and Separations | Glass kinds $n_D$ | V |
|---|---|---|---|---|
| $L_1$ | $r_1 = +109.14$ | $d_1 = 3.7$ | 1.50380 | 66.7 |
| | $r_2 = + 52.63$ | $l_1 = 13.2$ | | |
| $L_2$ | $r_3 = +110.25$ | $d_2 = 3.7$ | 1.48697 | 70.3 |
| | $r_4 = + 50.72$ | $l_2 = 35.0$ | | |
| | $r_5 = + 56.24$ | | | |
| $L_3$ | | $d_3 = 29.3$ | 1.72050 | 50.3 |
| $L_4$ | $r_6 = + 25.37$ | $d_4 = 13.3$ | 1.60739 | 59.5 |
| | $r_7 = - 194.92$ | $l_3 = 4.7$ | | |
| | $r_8 = - 252.70$ | | | |
| $L_5$ | | $d_5 = 2.8$ | 1.56993 | 57.5 |
| $L_6$ | $r_9 = + 30.59$ | $d_6 = 23.7$ | 1.62500 | 53.3 |
| $L_7$ | $r_{10} = - 25.51$ | $d_7 = 18.2$ | 1.71966 | 29.3 |
| | $r_{11} = - 57.38$ | $l_4 = 39.0$ | | |
| | $r_{12} = - 40.15$ | | | |
| $L_8$ | | $d_8 = 9.8$ | 1.64200 | 58.1 |
| | $r_{13} = - 102.64$ | | | |

Example 3

[Focal length f=100 mm.   Relative aperture 1:3.4]

| | Radii | Thickness and Separations | Glass kinds $n_D$ | V |
|---|---|---|---|---|
| $L_1$ | $r_1 = +138.19$ | $d_1 = 3.4$ | 1.50380 | 66.7 |
| | $r_2 = + 73.80$ | $l_1 = 17.8$ | | |
| $L_2$ | $r_3 = +162.28$ | $d_2 = 3.4$ | 1.48697 | 70.3 |
| | $r_4 = + 74.64$ | $l_2 = 56.2$ | | |
| | $r_5 = + 76.38$ | | | |
| $L_3$ | | $d_3 = 40.1$ | 1.72050 | 50.3 |
| $L_4$ | $r_6 = + 33.62$ | $d_4 = 18.2$ | 1.60739 | 51.0 |
| | $r_7 = - 267.23$ | $l_3 = 6.4$ | | |
| | $r_8 = - 346.44$ | | | |
| $L_5$ | | $d_5 = 3.9$ | 1.56993 | 57.5 |
| $L_6$ | $r_9 = + 41.93$ | $d_6 = 34.3$ | 1.62500 | 59.0 |
| $L_7$ | $r_{10} = - 31.48$ | $d_7 = 19.6$ | 1.71966 | 29.3 |
| | $r_{11} = - 76.36$ | $l_4 = 69.6$ | | |
| | $r_{12} = - 55.28$ | | | |
| $L_8$ | | $d_8 = 12.5$ | 1.64200 | 58.1 |
| | $r_{13} = - 93.62$ | | | |

I claim:

1. An objective consisting of five lens components separated by air spaces, the first component facing the object to be photographed and the second component being each a dispersing meniscus element the respective outer surfaces of which being bent towards the object, the third and the fourth said conponents being each converging and composed of several lenses, the fifth component being a dispersing meniscus element with its outer convex surface bent towards the image, the air space between the first and second said components having the shape of a collecting meniscus element with its convex outer surface directed towards the object, the second and the fourth air spaces having each the shape of a meniscus element with the respective outer surfaces being bent towards the object and the image respectively, the quotient between the focal lengths of the first component and the second component lying between .35 and 3.0.

2. An objective consisting of five lens components separated by air spaces, the first component facing the object to be photographed and the second component being each a dispersing meniscus element the respective outer surfaces of which being bent towards the object, the third and the fourth said components being each converging and composed of several lenses, the fifth component being a dispersing meniscus element with its outer convex surface bent towards the image, the air space between the first and second said components having the shape of a collecting meniscus element with its convex outer surface directed towards the object, the second and the fourth air spaces having each the shape of a meniscus element with the respective outer surfaces being bent towards the object and the image respectively, the separation of the outer surfaces of the third and fourth said components directed towards the object and the image respectively being greater than .40 of the focal length f of the objective and smaller than 1.6 of this focal length.

3. An objective consisting of five lens components separated by air spaces, the first component facing the object to be photographed and the second component being each a dispersing meniscus element the respective outer surfaces of which being bent towards the object, the third and the fourth said components being each converging and composed of several lenses, the fifth component being a dispersing meniscus element with its outer convex surface bent towards the image, the air space between the first and second said components having the shape of a collecting meniscus element with its convex outer surface directed towards the object, the second the fourth air spaces having each the shape of a meniscus element with the respective outer surfaces being bent towards the object and the image respectively, the quotient between the focal lengths of the first component and the second component lying between .35 and 3.0, the third and fourth said components each containing a cemented surface being convex towards the object and the image respectively, the sum of radii of curvature of said cemented surfaces being greater than .30 f and smaller than 1.0 f, and in each said third and fourth components the glass adjacent to the convex side of said cemented surface having a refractive index higher than that adjacent to the concave side.

4. An objective consisting of five lens components separated by air spaces, the first component facing the object to be photographed and the second component being each a dispersing meniscus element the respective outer surfaces of which being bent towards the object, the third and the fourth said components being each converging and composed of several lenses, the fifth component being a dispersing meniscus element with its outer convex surface bent towards the image, the air space between the first and second said components having the shape of a collecting meniscus element with its convex outer surface directed towards the object, the second and the fourth air spaces having each the shape of a meniscus element with the respective outer surfaces being bent towards the object and the image respectively, the separation of the outer surfaces of the third and fourth said components directed towards the object and the image respectively being greater than .40 of the focal length f of the objective and smaller than 1.6 of this focal length, the third and fourth said components each containing a cemented surface being convex towards the object and the image respectively, the sum of radii of curvature of said cemented surfaces being greater than .30 f and smaller than 1.0 f, and in each said third and fourth components the glass adjacent to the convex side of said cemented surface having a refractive index higher than that adjacent to the concave side.

5. An objective consisting of five lens components separated by air spaces, the first component facing the object to be photographed and the second component being each a dispersing meniscus element the respective outer surfaces of which being bent towards the object, the third and the fourth said components being each converging and composed of several lenses, the fifth component being a dispersing meniscus element with its outer convex surface bent towards the image, the air space between the first and second said components having the shape of a collecting meniscus element with its convex outer surface directed towards the object, the second and the fourth air spaces having each the shape of a meniscus element with the respective outer surfaces being bent towards the object and the image respectively, the quotient between the focal lengths of the first component and the second component lying between .35 and 3.0, the air space between the third and fourth said components being greater than .03 f, and smaller than .15 f.

6. An objective consisting of five lens components separated by air spaces, the first component facing the object to be photographed and the second component being each a dispersing meniscus element the respective outer surfaces of which being bent towards the object, the third and the fourth said components being each converging and composed of several lenses, the fifth component being a dispersing meniscus element with its outer convex surface bent towards the image, the air space between the first and second said components having the shape of a collecting meniscus element with its convex outer surface directed towards the object, the second and the fourth air spaces having each the shape of a meniscus element with the respective outer surfaces being bent towards the object and the image respectively, the separation of the outer surfaces of the third and fourth said components directed towards the object and the image respectively being greater than .40 of the focal length f of the objective and smaller than 1.6 of this focal length, the air space between the third and fourth said components being greater than .03 f, and smaller than .15 f.

7. An objective consisting of five lens components separated by air spaces, the first component facing the object to be photographed and the second component being each a dispersing meniscus element the respective outer surfaces of which being bent towards the object, the third and the fourth said components being each converging and composed of several lenses, the fifth component being a dispersing meniscus element with its outer convex surface bent towards the image, the air space between the first and second said components having the shape of a collecting meniscus element with its convex outer surface directed towards the object, the second and the fourth air spaces having each the shape of a meniscus element with the respective outer surfaces being bent towards the object and the image respectively, the quotient between the focal lengths of the first component and the second component lying between .35 and 3.0, at least the fourth said component containing a cemented surface convex towards the object, and the glass adjacent to said convex side of said surface having a refractive index lower than that adjacent to the concave side, and the radius of curvature of said surface being greater than .15 f and smaller than .65 f.

8. An objective consisting of five lens components separated by air spaces, the first component facing the object to be photographed and the second component being each a dispersing meniscus element the respective outer surfaces of which being bent towards the object, the third and the fourth said components being each converging and composed of several lenses, the fifth component being a dispersing meniscus element with its outer convex surface bent towards the image, the air space between the first and second said components having the shape of a collecting meniscus element with its convex outer surface directed towards the object, the second and the fourth air spaces having each the shape of a meniscus element wtih the respective outer surfaces being bent towards the object and the image respectively, the separation of the outer surfaces of the third and fourth said components directed towards the object and the image respectively being greater than .40 of the focal length f of the objective and smaller than 1.6 of this focal length, at least the fourth said component containing a cemented surface convex towards the object, and the glass adjacent to said convex side of said surface having a refractive index lower than that adjacent to the concave side, and the radius of curvature of said surface being greater than .15 f and smaller than .65 f.

References Cited in the file of this patent

UNITED STATES PATENTS

| | | |
|---|---|---|
| 435,271 | Abbe et al. | Aug. 26, 1890 |
| 2,031,792 | Richter | Feb. 25, 1936 |
| 2,247,068 | Richter | June 24, 1941 |
| 2,516,724 | Roossinov | July 25, 1950 |
| 2,628,532 | Baker | Feb. 17, 1953 |

FOREIGN PATENTS

| | | |
|---|---|---|
| 225,398 | Great Britain | Dec. 4, 1924 |
| 620,538 | Germany | Oct. 23, 1935 |